United States Patent [19]

Ehrsam et al.

[11] 4,074,066

[45] Feb. 14, 1978

[54] MESSAGE VERIFICATION AND TRANSMISSION ERROR DETECTION BY BLOCK CHAINING

[75] Inventors: William Friedrich Ehrsam, Hurley; Carl H. W. Meyer, Kingston; John Lynn Smith; Walter Leonard Tuchman, both of Woodstock, all of N.Y.

[73] Assignee: International Business Machines Corporation, Armonk, N.Y.

[21] Appl. No.: 680,404

[22] Filed: Apr. 26, 1976

[51] Int. Cl.² .............................................. H04L 9/02
[52] U.S. Cl. .................................................. 178/22
[58] Field of Search .......................... 178/22; 35/4; 340/146.1 AL

[56] References Cited

U.S. PATENT DOCUMENTS

| | | | |
|---|---|---|---|
| 3,657,699 | 4/1972 | Rocher et al. | 178/22 |
| 3,725,579 | 4/1973 | Sturzinger | 178/22 |
| 3,796,830 | 3/1974 | Smith | 178/22 |
| 3,949,208 | 4/1976 | Carter | 340/146.1 AL |
| 3,958,081 | 3/1976 | Ehrsam et al. | 178/22 |

Primary Examiner—Samuel W. Engle
Assistant Examiner—S. A. Cangialosi
Attorney, Agent, or Firm—Edwin Lester

[57] ABSTRACT

A message transmission system for the secure transmission of multi-block data messages from a sending station to a receiving station.

The sending station contains cryptographic apparatus operative in successive cycles of operation during each of which an input block of clear data bits is ciphered under control of an input set of cipher key bits to generate an output block of ciphered data bits for transmission to the receiving station. Included in the cryptographic apparatus of the sending station is means providing one of the inputs for each succeeding ciphering cycle of operation as a function of each preceding ciphering cycle of operation. As a result, each succeeding output block of ciphered data bits is effectively chained to all preceding cycles of operation of the cryptographic apparatus of the sending station and is a function of the corresponding input block of clear data bits, all preceding input blocks of clear data bits and the initial input set of cipher key bits.

12 Claims, 9 Drawing Figures

VALIDATION WITHOUT BLOCKCHAINING

▨ FIRST AUTHENTICATION BYTE        ▨ SECOND AUTHENTICATION BYTE

VALIDATION WITH BLOCKCHAINING

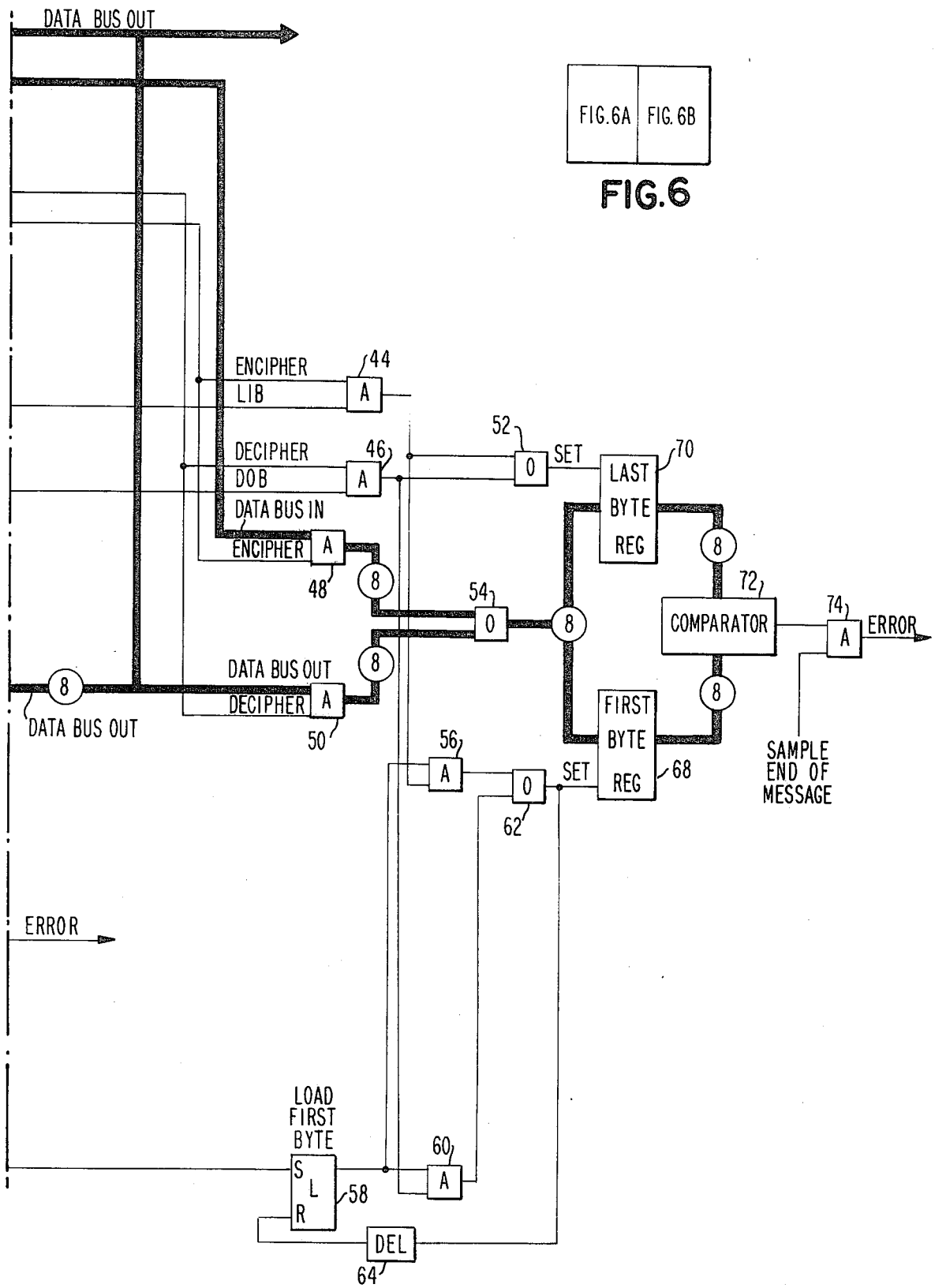

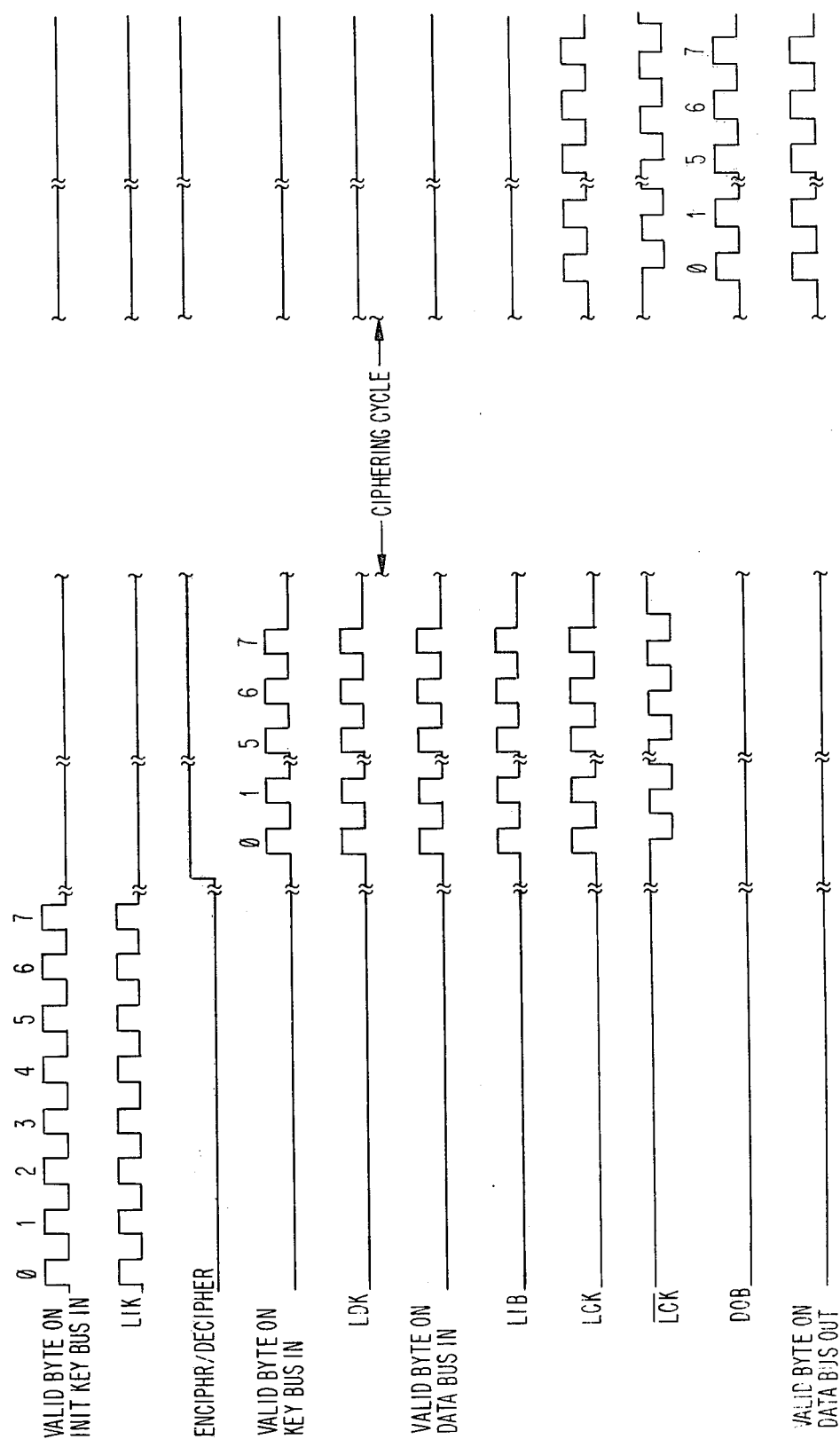

MESSAGE VERIFICATION AND TRANSMISSION ERROR DETECTION BY BLOCK CHAINING

CROSS REFERENCE TO RELATED APPLICATION

Reference is hereby made to application Ser. No. 680,405 of L. B. Tuckerman, III filed concurrently herewith and entitled "Block-Cipher Cryptographic System with Chaining" which discloses another form of block chaining arrangement and is assigned to the same assignee as the present application.

BACKGROUND OF THE INVENTION

This invention relates to a message transmission system and more particularly, to a system for the secure transmission of multi-block data messages from a sending station to a receiving station.

Present-day data processing systems are increasing in complexity and may include networks involving a host processor or processors connected to local terminals of I/O devices which, in some instances, may involve long cable connections, and/or via communication lines to remote terminals or remote subsystems which, in turn, may likewise be connected onward to local or remote terminals or I/O devices. Furthermore, many of the terminals and/or I/O devices may have removeable storage media associated therewith. Because of the potential accessibility of the communication lines, the long cable connections and the removable storage media, there is increasing concern over the interception or alteration of data during message transmissions within the networks of the data processing system. Cryptography has been recognized as one type of process for achieving data security and privacy of such data transmissions in that it protects the data itself rather than the data transmitting medium.

Various cryptographic arrangements have been developed in the prior art for maintaining the security and privacy of data transmissions between a sending station and a receiving station. Block ciphering is one such arrangement by which a block cipher device, operating in a ciphering cycle of operation, ciphers a block of data bits under control of a set of cipher key bits. In data message transmission systems where block ciphering is used, the block cryptographic apparatus of the sending station ciphers an input block of data bits under control of the set of cipher key bits to produce an output block of unintelligible ciphered data bits which cannot be understood without knowledge of the cipher key. The resulting output block of ciphered data bits is then transmitted to the receiving station where the block cryptographic apparatus of the receiving station deciphers the output block of ciphered data bits under control of the same set of cipher key bits in inverse fashion to that of the enciphering process to produce the original input block of data bits. Examples of block ciphering are described in U.S. Pat. No. 3,798,359 issued March 19, 1974 and U.S. patent application Ser. No. 552,685 commonly assigned to the same assignee as the present application.

In block ciphering, each data bit of the output block is a complex function of all the data bits of the input block and the set of cipher key bits. Consequently, any change of a single input data bit affects all output data bits. This property of block ciphering permits the inclusion of an authentication field in the input block of data bits which may be used for verification of data transmission between the sending station and a receiving station. One such approach taken in the prior art is to include a password with the input block of data bits to be transmitted from the sending station to the receiving station. The input block of data bits is then ciphered by means of block cryptographic apparatus at the sending station and the resulting output block of ciphered data bits is then transmitted to the receiving station. At the receiving station, the received output block of ciphered data bits is deciphered by means of block cryptographic apparatus. If the communication is uncorrupted, then the deciphered block of data bits will be identical to the original input block of data bits. If the receiving station has a copy of the password, then it may be matched against the deciphered password to verify the block transmission. Examples of this technique are described in U.S. Pat. No. 3,798,360 and U.S. Pat. No. 3,798,605, both issued Mar. 19, 1974.

In such an arrangement where multiple blocks of data bits are to be transmitted between the sending station and the receiving station, the successive input blocks of data bits are block ciphered by the block cryptographic apparatus of the sending station, operating in successive cycles of operation under control of the same set of cipher key bits, to produce successive output blocks of ciphered data bits. The output message of the sending station is then transmitted to the receiving station where the block cryptographic apparatus of the receiving station, operating in successive cycles of operation under control of the same set of cipher key bits in inverse fashion to produce the original multiple blocks of data bits. Any change of a single data bit in any block of the output message transmitted to the receiving station, while still affecting all the deciphered data bits of the corresponding deciphered block of data bits, will have no effect on any of the other deciphered blocks of the data message. As a result, to verify the entire message transmission, it is necessary to include a password with each block of data bits transmitted from the sending station to the receiving station. Because of the necessity of including a password with each transmitted block of data bits, the throughput efficiency of the system is degraded.

SUMMARY OF THE INVENTION

Accordingly, it is an object of this invention to provide a system capable of maintaining the security of multi-block data message transmissions without significantly degrading system throughput.

Another object of this invention is to provide cryptographic apparauts for ciphering mutli-block data messages in successive cycles of operation with each succeeding ciphered data block being chained to all preceding cycles of operation.

A further object of the invention is to provide cryptographic apparatus for ciphering input blocks of data bits under control of input sets of cipher key bits to generate output blocks of ciphered data bits in successive cycles of operation with one of the inputs for each succeeding cycle of operation being produced as a function of each preceding cycle of operation.

Still another object of the invention is to provide cryptographic apparatus for ciphering multi-block data messages under control of corresponding multi-sets of cipher keys in successive cycles of operation with each succeeding set of cipher keys being chained to the preceding cycles of operation.

Still a further object of the invention is to provide cryptographic apparatus for ciphering an input message consisting of multi-blocks of data bits under control of an input set of cipher key bits in successive cycles of operation with each succeeding output block of ciphered data bits being a function of the corresponding input block of data bits, all preceding input blocks of data bits and the input set of cipher key bits.

Still another object of the invention is to provide cryptographic apparatus for ciphering input blocks of data bits under control of input sets of cipher key bits to generate output blocks of ciphered data bits in successive cycles of operation with each succeeding set of cipher key bits being generated by modifying the preceding set of cipher key bits as a function of the preceding input block and output block of data bits.

A still further object of the invention is to provide a system for verifying message transmissions between a sending station and a receiving station against transmission erros.

Still another object of the invention is to provide a cryptographic process for maintaining the security of multi-block data message transmissions between a sending station and a receiving station.

In accordance with the invention, a system is provided for multi-block data message communications between a sending station and a receiving station. The sending station includes cryptographic apparatus which performs a block chaining process to enhance message security and integrity. This is accomplished by applying an input message consisting of successive input blocks of clear data bits and an initial set of cipher key bits to the cryptographic apparatus of the sending station. The cryptographic apparatus ciphers the input message in successive cycles of operation during each of which an input block of clear data bits is ciphered under control of an input set of cipher key bits to provide an output block of ciphered data bits. One of the inputs for each succeeding cycle of operation of the cryptographic apparatus is provided as a function of each preceding cycle of operation so that each succeeding output block of ciphered data bits is chained to all preceding cycles of operation of the cryptographic apparatus and is a function of the corresponding input block of clear data bits, all preceding input blocks of clear data bits and the initial input set of cipher key bits.

An advantage of this block chaining process occurs in the transmission of sterotype messages consisting of identical blocks of clear data bits. With the block chaining technique of the present invention, since the cipher key is changed for each cycle of operation, each succeeding ciphered block of the sterotype message will be different from each other thereby providing security for such message transmissions.

The receiving station also includes cryptographic apparatus which likewise performs a block chaining process. This is accomplished by applying an input message received from the sending station consisting of successive blocks of ciphered data bits and an initial input set of cipher key bits to the cryptographic apparatus of the receiving station. The cryptographic apparatus of the receiving station deciphers the input message in successive cycles of operation during each of which an input block of ciphered data bits is deciphered under control of an input set of cipher key bits to provide an output block of clear data bits corresponding to the original input block of clear data bits applied to the sending station. One of the inputs for each succeeding cycle of operation of the cryptographic apparatus of the receiving station is provided as a function of each preceding cycle of operation so that each succeeding output block of clear data bits is chained to all preceding cycles of operation of the cryptographic apparatus of the receiving station and is a function of the corresponding input block of ciphered data bits, all preceding input blocks of ciphered data bits and the initial input set of cipher key bits.

Verification of message transmission from the sending station to the receiving station is accomplished as a result of the block chaining technique. Thus, by including identical authentication fields at the beginning and end of the input message of the sending station, any alteration of any block of ciphered data bits of the output message transmitted from the sending station to the receiving station will affect the corresponding block of deciphered data bits and all succeeding blocks of deciphered data bits of the output message of the receiving station. Accordingly, by comparing the deciphered versions of the authentication fields of the output message from the receiving station a match will verify the accuracy of the message transmission whereas a mismatch will indicate an alteration of the message transmission.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIG. 6 is a diagram of how FIGS. 6A and 6B may be placed to form a composite block diagram.

FIGS. 6A and 6B, taken together, comprise a detailed schematic diagram of the block cryptographic apparatus of the present invention.

FIG. 7 comprises a timing diagram of a cycle of operation for a representative block of a multi-block message in the block cryptographic apparatus of the present invention.

GENERAL DESCRIPTION

Figure 1:
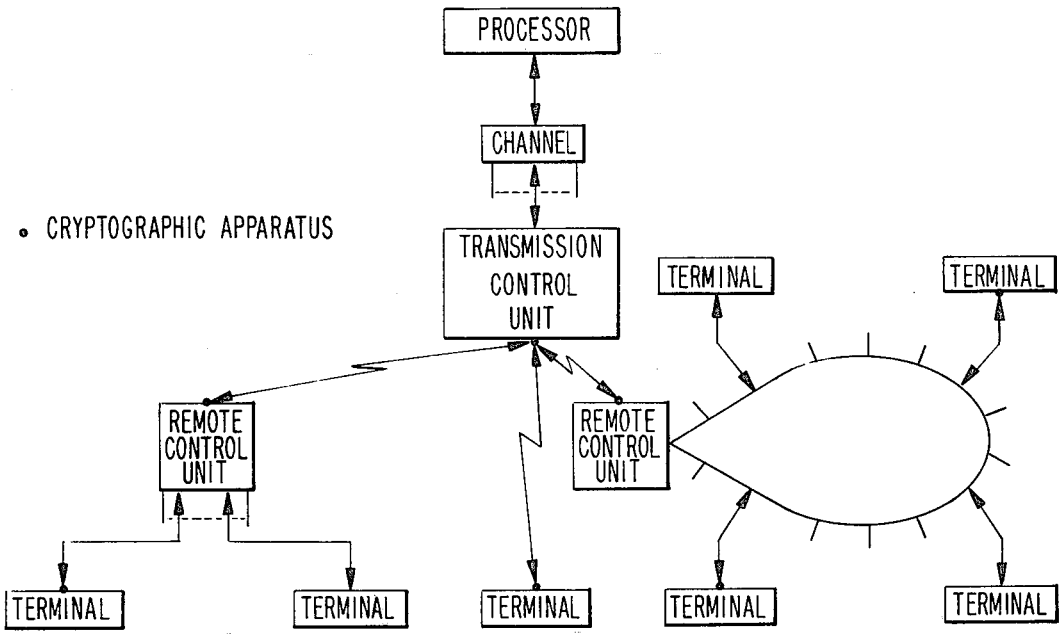
FIG. 1 is a block diagram illustrating the location of cryptographic apparatus in a data processing system.

In a data processing network where data is communicated via communication lines between a processor and remote control units or remote terminals, it may be expected that at some time an unscrupulous individual will attempt to intercept or altr data being communicated within the network. One mechanism for achieving data security and privacy in such situations is to use block cryptographic apparatus located at strategic locations within the network. At the sending station an input message consisting of successive blocks of clear data bits may be ciphered by a block cipher device and then transmitted to a receiving station where the blocks of ciphered data may be deciphered by a block cipher device to obtain the original blocks of clear data bits. Likewise, when the functions of the receiving and sending stations are reversed, the functions of the block cipher devices associated with the receiving and sending stations will likewise be reversed so that blocks of clear data from the receiving station, now operating as the sending station, will be ciphered and transmitted to the sending station, now operating as the receiving station, where it is deciphered back to the original blocks of clear data bits. FIG. 1 illustrates the location of such block cryptographic apparatus in a representative data processing network.

Figure 2:
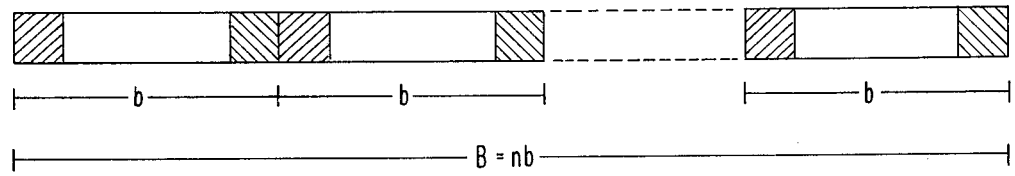
FIG. 2 is a diagram of the format of an input message without block chaining.

Referring now to FIG. 2, an input message is shown having a length $B = nb$ where $n$ is the number of blocks and $b$ is the block size. It should be recognized by those skilled in the art, that the principles of this invention are not limited to any particular data block size and, therefore, the data blocks may be of any size. However, for illustrative purposes, each data block may consist of 64 bits arranged into 8 byte groups with each byte consisting of 8 bits. In block ciphering, because each data bits of an output block is a complex function of all the data bits of an input block and the set of cipher key bits, any change of a single data bit in the input block affects all the data bits in the output block. As a result, the transmission of a block of data bits may be verified by the inclusion of identical authentication fields which may consist of one or more bytes at the beginning and end of the input block of data bits. At the sending station, the block of data including the authentication fields is ciphered and transmitted to the receiving station where the deciphered versions of the authentication fields may be compared to verify the accuracy of the block transmission.

While a change of a single data in an input block affects all the data bits of the corresponding output block, such a change will have no effect on the succeeding blocks of the message. Accordingly with this type of message transmission, it is necessary to include authentication fields with each input block in order to verify the accuracy of each block transmission. It should be apparent that with this arrangement there is a serious degradation of throughput efficiency.

Figure 3:
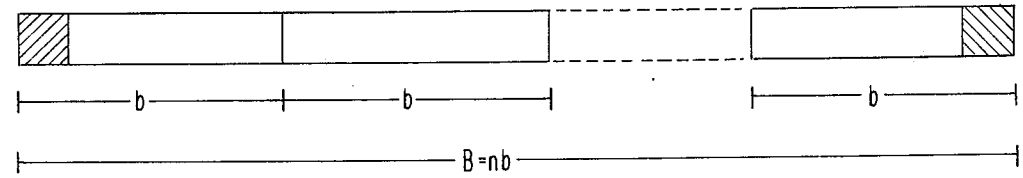
FIG. 3 is a diagram of the format of an input message with block chaining.

Throughput may be improved by the method of block chaining which interconnects the blocks in such a way that each succeeding output block of data bits is a function of the corresponding input block of data bits, all preceding input blocks of data bits and the input set of cipher key bits. As a result, any change of a single data bit in any block of the message transmitted from the sending station to a receiving station will affect the corresponding output block of data bits and propagate and affect all succeeding output blocks of the message. Because of this property of block chaining, authentication fields need only be included at the beginning and end of the total message, as shown in FIG. 3, in order to verify the accuracy of the message transmission, rather than in each block of the message as in the case where block chaining is not used. Therefore, since authentication fields are only included at the beginning and end of the entire message, it should be apparent that the uses of block chaining does not significantly degrade the transmission efficiency of a long message.

Figure 4:
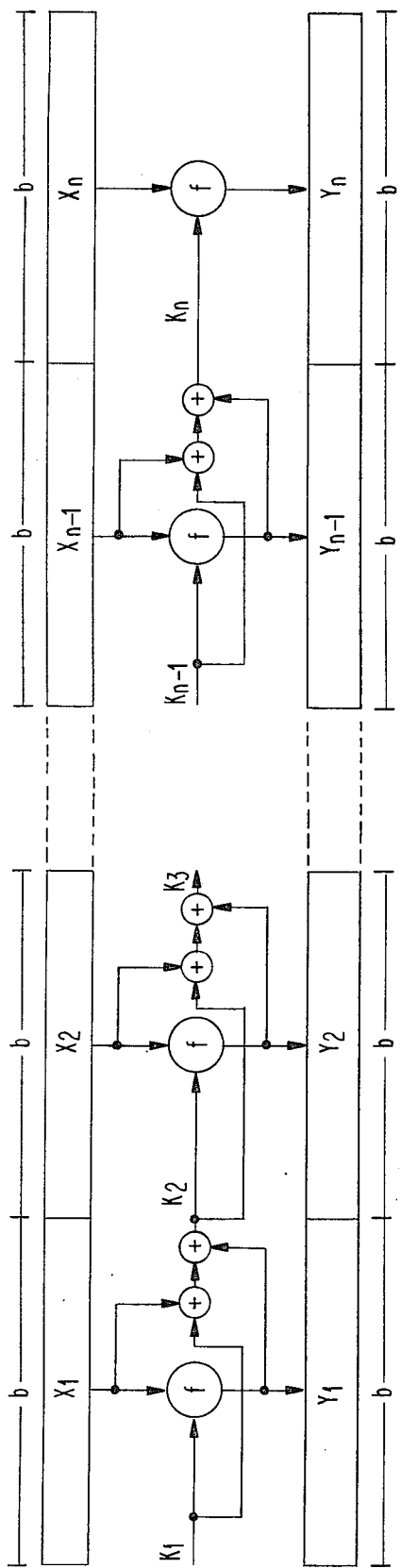
FIG. 4 is a simplified diagram illustrating the block chaining process for encipherment.
Figure 5:
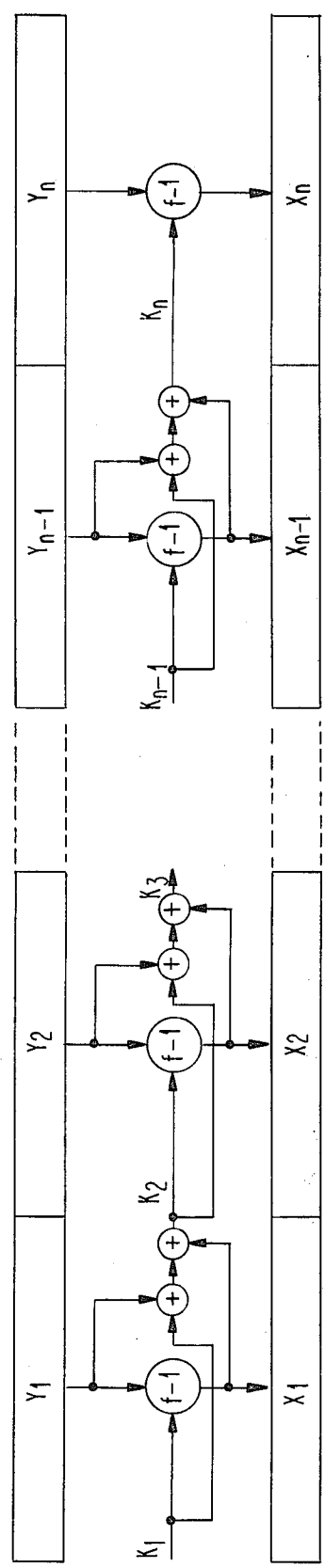
FIG. 5 is a simplified diagram illustrating the block chaining process for decipherment.

Referring now to FIGS. 4 and 5, there are shown simplified block diagrams of the block chaining process for encipherment and decipherment. In particular, FIG. 4 illustrates the block chaining process for encipherment operative in $n$ successive cycles of operation. During each cycle an input block X of clear data bits is ciphered under control of an input set K of cipher key bits to generate an output block Y of ciphered data bits. Thus, in the case of the first cycle, the cipherment may be expressed as $Y_1 = f(X_1, K_1)$ where $X_1$ is the input block of clear data bits, $K_1$ is the input set of cipher key bits, $f$ is the block cipher function and $Y_1$ is the output block of ciphered data bits.

Block chaining is accomplished by providing a set of cipher key bits for each succeeding ciphering cycle as a function of each preceding ciphering cycle. This is done by first modulo-2 adding the first input set $K_1$ of cipher key bits with the first input block $X_1$ of clear data bits and retaining the result while the block cipher function is performed to produce the first output block $Y_1$ of ciphered data bits. As the first block $Y_1$ of cipher data bits is produced it is modulo-2 added to the result of the first modulo-2 addition to provide an input set $K_2$ of cipher key bits for the succeeding cycle. This may be expressed as $K_2 = K_1 \oplus X_1 \oplus Y_1$, where $\oplus$ represents a modulo-2 addition. In the case of the second cycle, the cipherment may be expressed as $Y_2 = f(X_2, K_2)$ and by substituting the above expression for $K_2$, the cipherment may be expressed $Y_2 = f(X_2, K_1 \oplus X_1 \oplus Y_1)$. It should be apparent, therefore, that the output block $Y_2$ of cipher data bits is a function of the corresponding input block $X_2$ of clear data bits, the preceding input block $X_1$ of clear data bits and the input set $K_1$ of cipher key bits. This relationship holds true for all succeeding ciphering cycles of operation and, as a result, each succeeding output block of ciphered data bits is effectively chained to all preceding ciphering cycles of operation and is a function of the corresponding input block of clear data bits, all preceding input blocks of clear data bits and the initial input set of cipher key bits.

Referring now to FIG. 5, there is illustrated the block chaining process for decipherment operative in $i$ $n$ successive cycles of operation. During each cycle an input block Y of ciphered data bits is deciphered under control of an input set K of cipher key bits to generate an output block X of clear data bits which in the case of the first ciphering cycle may be expressed as $X_1 = f^{-1}(Y_1, K_1)$ where $f^{-1}$ is the block cipher function and is the inverse of that performed in the encipherment process.

Block chaining for decipherment is accomplished in the same way as for encipherment, i.e., by providing a set of cipher key bits for each succeeding cycle as a function of each preceding cycle. This is done by first modulo-2 adding the first input set $K_1$ of cipher key bits with the first input block $Y_1$ of ciphered data bits and retaining the result while the block cipher function is performed to produce the first output block $X_1$ of clear data bits. As the first output block $X_1$ of clear data bits is produced it is modulo-2 added to the result of the first modulo-2 addition to provide the input set $K_2$ of cipher key bits for the succeeding cycle which may be expressed as $K_2 = K_1 \oplus Y_1 \oplus X_1$, this term being mathematically equivalent to the $K_2$ term of the enciphering process. In the case of the second cycle, the decipherment may be expressed as $X_2 = f^{-1}(Y_2, K_2)$ and by substituting the above expression for $K_2$, the decipherment may be expressed as $X_2 = f^{-1}(Y_2, K_1 \oplus Y_1 \oplus X_1)$. It should be apparent, therefore, that the output block $X_2$ of clear bits is a function of the corresponding input block $Y_2$ of ciphered data bits, the preceding input block $Y_1$ of ciphered data bits and the initial input set $K_1$ of cipher key bits. This relationship, as in the case of encipherment, holds true for all succeeding cycles of operation and, as a result, each succeeding output block of clear data bits is effectively chained to all preceding cycles of operation and is a function of the corresponding input block of ciphered data bits, all preceding input blocks of ciphered data bits and the initial input set of cipher key bits.

DETAILED DESCRIPTION OF DISCLOSED EMBODIMENT

Figure 6A:
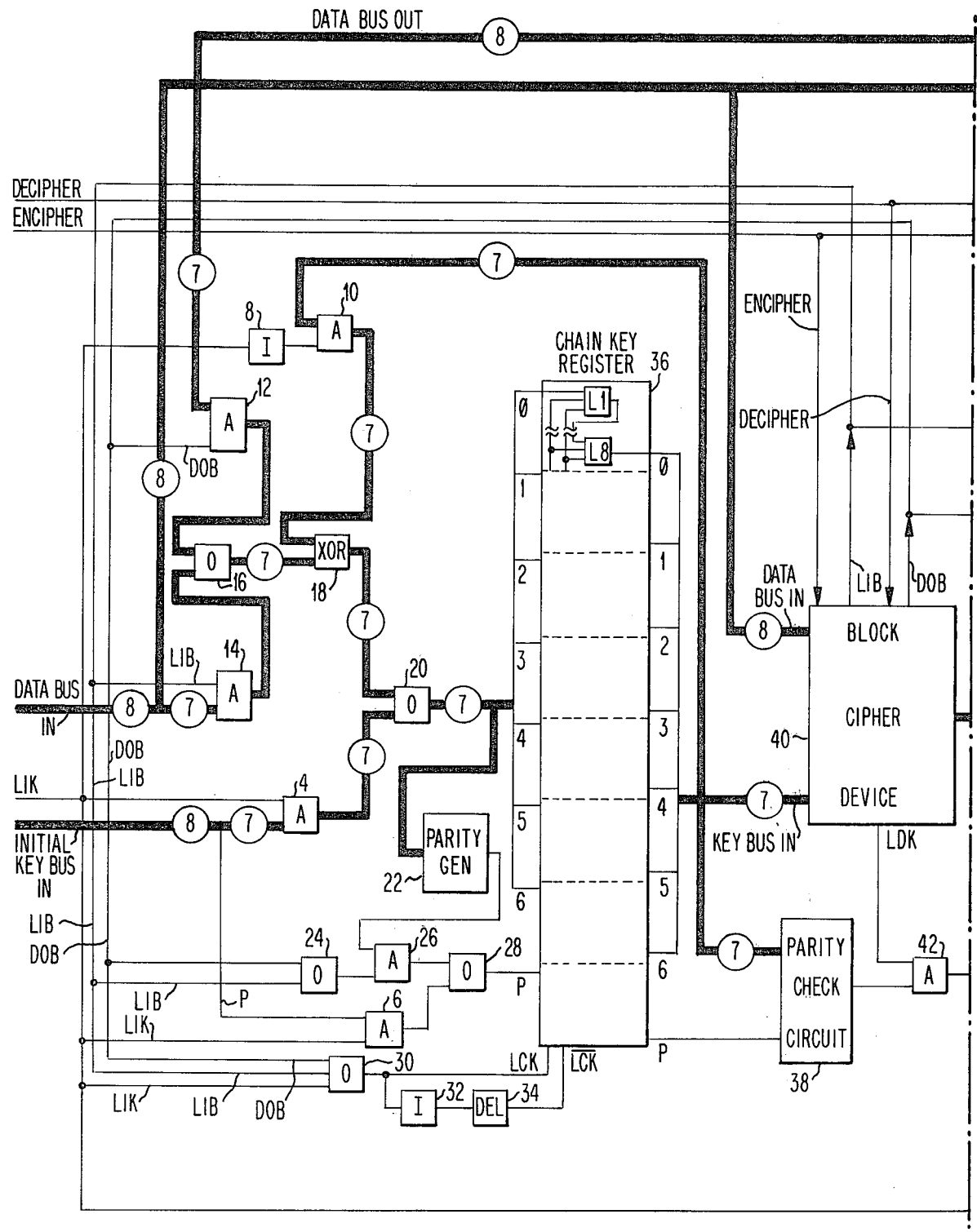

Referring now to FIGS. 6A and 6B, taken together, there is shown a detailed schematic diagram of the block cipher apparatus of the present invention for implementing the block chaining process and a detailed description will follow taken in connection with the timing diagram of FIG. 7.

Various portions of the schematic diagram have been consolidated and simplified in order not to obscure the disclosure with details which will be readily apparent to those skilledl in the art. Accordingly, various bus cables are shown with a circled number indicating the number of lines in the cable and each logic circuit associated with each cable being representative of a plurality of logic circuits equal in number to the number of lines in the cable to which it is connected.

ENCIPHERING PROCESS

Let it be assumed that an input message consisting of $n$ blocks of clear data is to be transmitted from a sending station to a receiving station with each block consistinhg of 64 data bits arranged into 8-bit bytes. Further, let it be assumed that it is desired to maintain the security of the message transmission to the receiving station and, accordingly, identical authentication bytes are included at the beginning and end of the input message, as shown in FIG. 3. Then, prior to transmission, the input message is enciphered under control of an initial input set of cipher key bits which may consist of 64 bits arranged into 8 bytes with each byte consisting of 7 cipher key bits and a parity bit for parity checking. Prior to the enciphering process, the sending station applies an initial input set of cipher key bits, a byte at a time, to the Initial Key Bus In of the cryptographic apparatus of the sending station necessitating 8 cycles to completely input the entire initial input cipher key.

During the first cycle, when a valid cipher key byte is present at the Initial Key Bus In, the sending station applies a Load Initial Key signal on the LIK line to condition the AND circuit 4 to pass the 7 cipher key bits of the first cipher byte via OR circuit 20 to 7 stages of the Chain Key register 36. The LIK signal is also applied to condition the AND circuit 6 to pass the parity bit of the first cipher byte via OR circuit 28 to the eighth stage of the Chain Key register 36. The LIK signal is further applied to set the Load First Byte latch 58 to its ON state thereby applying a signal to condition the AND circuit 56 preparatory to loading the first byte of the input message i.e. the authentication byte into the first byte register 68. The LIK signal is also applied to the inverter 8 where it is inverted to decondition the AND circuit 10 thereby blocking the feedback loop from the output of the Chain Key register 36 while the first cipher key byte is being loaded into the Chain Key register 36. The LIK signal is also applied via OR circuit 30 and to the inverter 32 where it is inverted and delayed by delay element 34 and applied to the LCK and $\overline{LCK}$ line inputs, respectively, of the Chain Key Register 36.

The Chain Key register 36 consists of 8 stages, the first of which is shown in detail with the remaining stages being shown in block form inasmuch as they are identical in detail to that of the first stage. Each stage of the Chain Key register 36 is comprised of a shift register consisting of 8 interconnected latch circuits. The latch circuit may be of any suitable type, one example of which is that described in the aforementioned patent application Ser. No. 552,685. The cipher key byte lines are connected, respectively, to the first latch circuit of each stage of the Chain Key register 36 while the control lines LCK and $\overline{LCK}$ are connected to all latches in each stage of the Chain Key register 36. Witnhin each stage, the output line from each latch circuit except the last is connected to an input of the next succeeding latch circuit while the output of the last latch circuit is connected as an output from the stage of the Chain Key register 36. Thus, during the first cycle, when a valid cipher key byte is being applied to the Chain Key register 36 corresponding control signals are applied on the LCK and $\overline{LCK}$ lines causing the first 8bit cipher key byte to be loaded into the first latch circuits of each of the 8 stages of the Chain Key register 36. During the remaining 7 cycles, the remaining 8-bit bytes of the cipher key are applied, a byte at a time, to the first latch circuit of each stage of the Chain Key register 36. The signals on the LCK and $\overline{LCK}$ lines are applied to all the latch circuits and are effective to load each succeeding cipher key byte into the Chain Key register 36 and to shift each preceding cipher key byte down by one position in each stage so that at the end of the eighth cycle the initial input set of cipher key bits is completely loaded into the Chain Key register 36 and the first cipher key byte appears at the output of the Chain Key register 36. The 7 cipher key bits of the cipher key byte output of the Chain Key register 36 are applied to a parity check circuit 38 which generates a parity bit which is compared against the parity but from the last stage of the Chain Key register. If the generated parity bit does not compare with the parity bit from the last stage of the Chain Key register 36, the AND circuit 42 is conditioned to signal a parity error. On the other hand, if the generated parity bit matches the parity bit from the last stage of the Chain Key register 36, the AND circuit 42 is deconditioned to inhibit signalling a parity error. This arrangement insures that no parity error occurs in transferring the 7 cipher key bits of the cipher key byte from the Chain Key register 36 to the Block Cipher device 40.

After the initial input set of cipher key bits is loaded into the Chain Key register 36, the sending station applies a signal on the Encipher line which is applied to signal the Block Cipher device 40 to prepare for a block cipher function and to condition the AND circuits 44 and 48. The Block Cipher device 40 is a device which when operating in a enciphering mode is capable of carrying out a block cipher function, i.e., ciphering an input block of data bits under control of an input set of cipher key bits to produce an output block of ciphered data bits. Examples of various arrangements which may be used in the Block Cipher device 40 of the present invention to perform the block cipher function are described in the aforementioned U.S. Pat. No. 3,798,359 and U.S. patent application Ser. No. 552,685. Consequently, the details of such a device need not be described here. For illustrative purposes, the Block Cipher device described in the aforementioned U.S. patent application Ser. No. 552,685 may be used as the Block Cipher device of the present invention though it should be apparent that any arrangement for carrying out a block cipher function may be equally as applicable.

The sending station now applies the first 8-byte block of the input message, a byte at a time, via the Data Bus In to the cryptographic apparatus necessitating 8 cycles to completely input the entire block of clear data bits. The timing and control unit (not shown) of the Block Cipher device 40 is effective to produce signals on the LIB and LDK lines for each of the 8 cycles, these signals being used internally in the Block Cipher device 40 for loading successive bytes of the input block of clear data bits and the initial input set of cipher key bits into the Block Cipher device 40 preparatory to carrying out the block cipher function. Thus, during the first cycle, upon the occurrence of the first signals on the LIB and LDK lines, 8 bits of the first valid clear data byte on the Data Bus In and 7 cipher key bits of the first cipher key byte from the output of the Chain Key register 36 are loaded into the Block Cipher device 40. In addition to loading the 7 cipher key bits into the Block Cipher device 40, the signal on the LDK line also samples the AND circuit 42 for a parity error in the transfer of the 7 cipher key bits from the Chain Key register 36 to the Block Cipher device 40. The first signal on the LIB line is also applied to render the AND circuit 14 effective to pass 7 of the 8 bits of the data byte, which may be arbitrarily selected, via OR circuit 16 to one input of the exclusive OR circuit 18. At the same time, since no LIK signal is present, the inverter 8 applies a signal to condition AND circuit 10 to pass the 7 cipher key bits of the first cipher key byte from the output of the Chain Key register 36 to the other input of the exclusive OR circuit 18. The exclusive OR circuit 18 functions as a modulo-2 adder for combining the 7 cipher key bits of the first cipher key byte with the 7bits of the first clear data byte with the resulting 7 bits being applied via OR circuit 20 to the Chain Key register 36. The 7-bit result of the modulo-2 addition is also applied to the parity generator 22 to generate a parity bit for the 7 bits being to the Chain Key register 36. The first signal on the LIB line is also applied via the OR circuit 24 to render the AND circuit 26 effective to pass the parity bit via the OR circuit 28 to the Chain Key register 36. At the same time, the first signal on the LIB line is also passed via the OR circuit 30 and via the inverter 32 and delay unit 34 to the LCK and $\overline{LCK}$ line inputs of the Chain Key register 36 thereby permitting the modified byte to be loaded into the Chain Key register 36.

The first signal on the LIB line is also passed via the conditioned AND circuit 44 and the OR circuit 52 to the set input of the Last Byte register 70. Similarly, the signal output from the AND circuit 44 is passed via the conditioned AND circuit 56 and the OR circuit 62 to the set input of the First Byte register 68. As a result, the first data byte, which is the authentication byte, is passed via the AND circuit 48, conditioned by the encipher signal, and OR circuit 54 and is loaded into both of the registers 68 and 70. The set signal from the OR circuit 62 is applied via delay element 64 to reset the Load First Byte latch 58, the delay being provided to insure the setting of register 68. The Load First Byte latch 58 in being reset applies a signal to decondition the AND circuit 56 and thereby remove the set signal to the rigister 68. As a result, only the authentication byte will be loaded into the register 68 whereas the set input for the register 70, being under control of the signals on the Encipher line and the LIB line, permits each succeeding byte of the input message to be successively loaded into the Last Byte register 70. If no error has occurred in inputting the input message to the cryptographic apparatus, the last byte of the input message should be an authentication byte identical to that which appeared as the first byte of the input message. Accordingly, at the end of the input message transfer to the cryptogrphic apparatus, the contents of registers 68 and 70 are compared by comparator 72 and if no error has occurred, AND circuit 74 will be deconditioned and a sample signal provided at the end of the message transfer to the cryptographic apparatus will be blocked from producing an error signal. On the other hand, if the contents of the registers 68 and 70 do not compare, a signal is applied to condition the AND circuit 74 so that the sample signal will cause an error signal to be produced. This error signal may be used to signal the sending station that the authentication bytes are not equal and therefore the enciphered input message should not be transmitted to the receiving station.

During the remaining 7 cycles after receipt of the first byte of clear data bits, the remaining bytes of the input block of clear data bits are transferred from the Data Bus In, an 8-bit byte at a time, to the Block Cipher device 40 and, at the same time, the remaining bytes of the initial input set of cipher key bits are transferred from the Chain Key register 36, 7 cipher key bits at a time, to the Block Cipher device 40, with each transferred 7 cipher key bit group being parity checked. Also, during this same time, each successive 7 cipher key bit group of the initial input set of cipher key bits is modulo-2 added to each successive 7 clear data bit group of the input block of clear data bits and locked back into the Chain Key register 36. It should be apparent that, at the end of these 8 cycles of operation, the Chain Key register 36 now stores the result of the modulo-2 addition of the first set $K_1$ of cipher key bits and the first input block $X_1$ of clear data bits which may be expressed as $K_1 \oplus X_1$.

Following this, the Block Cipher device 40 operates through a ciphering cycle of operation during which the input block of clear data bits is ciphered under control of the initial input set of cipher key bits to produce an output block of ciphered data bits which may be assembled in the sending station for transmission to the receiving station. The output block of ciphered data bits are transferred from the Block Cipher device 40 to the Data Bus Out an 8-bit byte at a time necessitating 8 cycles to complete the transfer. The transfers of these successive bytes are synchronized with DOB signals provided by the timing unit (not shown) of the block cipher device 40. In this case the Block Cipher device 40 provides 8 DOB signals to gate such succeeding byte of the output block to the Data Bus Out.

The first DOB signal is applied to condition the AND circuit 12 to pass 7 bits, which may be arbitrarily selected, of the first byte of the output block of ciphered data bits via the OR circuit 16 to one input of the exclusive OR circuit 18. At the same time, since no LIK signal is present, the inverter 8 applies a signal to condition AND circuit 10 to pass the 7 bits of the first byte of the modified set of cipher key bits from the output of the Chain Key register 36 to the other input of the exclusive OR circuit 18. The exclusive OR circuit 18 modulo-2 add the 7 bits of the first byte of the modified set of cipher key bits with 7 bits of the first byte of the output block of ciphered data bits with the resulting 7 bits being applied via the OR circuit 20 to the Chain Key register 36. The 7-bit result of this modulo-2 addition is also applied to the parity generator 22 to generate a parity bit for the 7 bits being applied to the Chain Key register 36. The first signal on the DOB line is also applied via the OR circuit 24 to render the AND circuit 26 effective to pass the parity bit via the OR circuit 28 to the Chain Key register 36. At the same time, the first signal on the DOB line is also passed via the OR circuit 30 and via the inverter 32 and delay unit 34 to the LCK and $\overline{\text{LCK}}$ line inputs, respectively, of the Chain Key register 36 thereby permitting the modified byte to be loaded into the Chain Key register 36. As the modified byte is loaded into the Chain Key register 36 the contents of the Chain Key register 36 is shifted down by one bit position and the next byte of the previous modulo-2 addition appears at the output of the Chain Key register 36. In a similar manner, during each of the remaining 7 cycles, each DOB signal is effective to pass the next byte of ciphered data bits via the AND circuit 12 and OR circuit 16 to the exclusive OR circuit 18 where it is modulo-2 added with the next modified byte of cipher key bits from the output of the Chain Key register 36 via the AND circuit 10 with the result being loaded into the Chain Key register 36 and shifting the contents thereof down by one bit position to make the next modified byte of cipher key bits available at the output of the Chain Key register 36 for the next cycle of operation.

The the completion of these 8 cycles of operation, the Chain Key register 36 now stores a set of cipher key bits for the next ciphering cycle of operation of the Block Cipher device 40. This set of cipher key bits may be represented by the term $K_2 = K_1 \oplus X_1 \oplus Y_1$. The cryptographic apparatus of the sending station can now operate in a similar manner as described above to produce the next output block $Y_2$ of ciphered data bits by loading the next input block $X_2$ of clear data bits and the input set $K_2$ of cipher key bits into the Block Cipher device 40 and carrying out another ciphering cycle of operation. The input block $X_2$ of clear data bits and the input set $K_2$ of cipher key bits are modulo-2 added $K_2 \oplus X_2$, in a similar manner to that described above for $K_1 \oplus X_1$, and loaded into the Chain Key register 36 while the input set $K_2$ of cipher key bits is loaded into the block cipher device 40. As before, after completing the ciphering cycle of operation, the output block $Y_2$ of ciphered data bits and the contents $K_2 \oplus X_2$ of the Chain Key register 36 are modulo-2 added to produce a resulting set of cipher key bits, which may be represented by the term $K_3 = K_2 \oplus X_2 \oplus Y_2$, for the next succeeding ciphering cycle of operation. Thus, it should be apparent that a new set of cipher key bits is provided for each succeeding ciphering cycle of operation as a function of the preceding ciphering cycle of operation. As a result, each succeeding output block of ciphered data bits is effectively chained to all preceding cycles of operation of the cryptographic apparatus and is a function of the corresponding input block of clear data bits, all preceding input blocks of clear data bits and the initial input set of cipher key bits.

In the case where sterotype messages, consisting of identical blocks of clear data bits, are to be transmitted between the sending station and the receiving station, the encipherment of such messages will result in identical blocks of ciphered data bits being transmitted to the receiving station where block chaining is not used. However, with the block chaining technique of the present invention, since the cipher key is changed for each ciphering cycle of operation, each succeeding ciphered block of a sterotype message will be different from each other and thereby provide a measure of security for the transmission of such messages. It should be apparent that with the block chaining process of the present invention the effective length of the "block" of the block cipher increases from $b$ to B where $b$ is the block size and $B = nb$ is the message size. Consequently, the clear text message would have to repeat in blocks of B in order that identical ciphered messages result. If even this is not desired, a randomly chosen byte or bytes can be included in the first block of each message so that no repetition of messages will occur.

DECIPHERING PROCESS

Referring again to FIGS. 6A and 6B, taken together, the detailed schematic diagram of the block cryptographic apparatus of the present invention will now be described for implementing the block chaining process during a deciphering process taken again in connection with the timing diagram of FIG. 7.

Let it be assumed that the ciphered input message generated by the sending station is now transmitted to the receiving station where it is to be deciphered back to the original input message. Prior to the deciphering process, the receiving station applies an initial input set of cipher key bits, which is identical to that used in the cryptographic apparatus of the sending station, a byte at a time to the Initial Key Bus In of the cryptographic apparatus of the receiving station necessitating 8 cycles to completely input the entire initial input cipher key.

During the first cycle, when a valid cipher key byte is present at the Initial Key Bus In, the sending station applies a signal of the LIK line to condition the AND circuit 4 to pass the 7 cipher key bits of the first cipher byte via OR circuit 20 to 7 stages of the Chain Key register 36. The LIK signal is also applied to condition the AND circuit 6 to pass the parity bit of the first cipher byte via OR circuit 28 to the eighth stage of the Chain Key register 36. The LIK signal is further applied to set the Load First Byte latch 58 to its ON state thereby applying a signal to condition the AND circuit 60 preparatory to loading the first deciphered byte of the message, i.e. the authentication byte, into the First Byte register 68. The LIK signal is also applied to the inverter 8 where it is inverted to decondition the AND circuit 10 thereby blocking the feedback loop from the output of the Chain Key register 36 while the first cipher key byte is being loaded into the Chain Key register 36. The LIK signal is also applied via OR circuit 30 and to the inverter 32 where it is inverted and delayed by delay element 34 and applied to the LCK and $\overline{\text{LCK}}$ line inputs respectively, of the Chain Key register 36.

The Chain Key register 36 of the cryptographic apparatus of the receiving station is identical to that of the sending station and consists of 8 stages each of which is comprised of a shift register consisting of 8 interconnected latch circuits. Thus, during the first cycle, when a valid cipher key byte is being applied to the Chain Key register 36 corresponding control signals are applied to the LCK and $\overline{\text{LCK}}$ lines causing the first 8-bit cipher key byte to be loaded into the first latch circuits of each of the 8 stages in the Chain Key register 36. During the remaining 7 cycles, the remaining 8-bit bytes of the cipher key are applied, a byte at a time, to the first latch circuit of each stage of the Chain Key register 36 and together with successive signals LCK and $\overline{\text{LCK}}$ lines applied to all the latch circuits successive cipher key bytes of the initial input set of cipher key bits are loaded into the Chain Key register 36. As each successive cipher key byte is stored in the Chain Key register 36, the cipher key byte previously loaded into the Chain Key register 36 is shifted down by one bit position so that at the end of the eighth cycle, the initial input set of cipher key bits is completely loaded into the Chain Key register 36 and the first cipher key byte appears at the output of the Chain Key register 36. The 7 cipher key bits of the cipher key byte output of the Chain Key register 36 is applied to a parity check circuit 38 which generates a parity bit which is compared against the parity bit from the last stage of the Chain Key register 36, in a manner as previously described for the enciphering process, to condition the AND circuit 42 if a parity error is detected.

After the initial input set of cipher key bits is loaded into the Chain Key register 36, the receiving station applies a signal on the Decipher line which is applied to signal the Block Cipher device 40 to prepare for a block cipher function and to condition the AND circuits 46 and 50. The Block Cipher device 40 when operating in a deciphering mode is capable of carrying out a block cipher function i.e. deciphering an input block of ciphered data bits under control of an input set of cipher key bits in an inverse fashion to that in the enciphering process to produce an output block of clear data bits. The receiving station now applies the first 8-byte block of the message transmitted from the sending station, a byte at a time, via the Data Bus In to the cryptographic apparatus necessitating 8 cycles to completely input the entire block of cipher data bits. The timing and control unit of the Block Cipher device 40 is effective to produce signals on the LIB and LDK lines for each of the 8 cycles, these signals being used internally in the Block Cipher device 40 for loading the successive bytes of input block of cipher data bits and the initial input set of cipher key bits into the Block Cipher device 40 preparatory to carrying out the block cipher function. Thus, during the first cycle, upon the occurrence of the first signals on the LIB and LDK lines, 8 bits of the first valid ciphered data byte on the Data Bus In and 7 cipher key bits of the first cipher key byte from the output of the Chain Key register 36 are loaded into the Block Cipher device 40. In addition to loading the 7 cipher key bits into the Block Cipher device 40, the signal on the LDK line also samples the AND circuit 42 for a parity error in the transfer of the 7 cipher key bits from the Chain Key register 36 to the Block Cipher device 40. The first signal on the LIB line is also applied to render the AND circuit 14 effective to pass 7 of the 8 bits of the ciphered data byte via OR circuit 16 to one input of the exclusive OR circuit 18. At the same time, since no LIK signal is present, the inverter 8 applies a signal to condition the AND circuit 10 to pass the 7 cipher key bits of the first cipher key byte from the output of the Chain Key register 36 to the other input of the exclusive OR circuit 18. The exclusive OR circuit 18 modulo-2 adds the 7 cipher key bits of the first cipher key byte with the 7 bits of the first ciphered data byte with the resulting 7 bits being applied via OR circuit 20 to the Chain Key register 36. The 7-bit result of the modulo-2 addition is also applied to the parity generator 22 to generate a parity bit for the 7 bits being applied to the Chain Key register 36. The first signal on the LIB line is also applied via the OR circuit 24 to render the AND circuit 26 effective to pass the parity bit via the OR circuit 28 to the Chain Key register 36. At the same time, the first signal on the LIB line is also passed via the OR circuit 30 and via the inverter 32 and delay unit 34 to the LCK and $\overline{LCK}$ line inputs of the Chain Key register 36 thereby permitting the modified byte to be loaded into the Chain Key register 36.

During the remaining 7 cycles, the remaining bytes of the input block of ciphered data bits are transferred from the Data Bus In, an 8-bit byte at a time, to the Block Cipher device 40 and, at the same time, the remaining bytes of the initial input set of cipher key bits are transferred from the Chain Key register 36, 7 cipher key bits at a time, to the Block Cipher device 40, with each transferred 7 cipher key bit group being parity checked. Also, during this same time, each successive 7 cipher key bit group of the initial input set of cipher key bits is modulo-2 added to each successive 7 ciphered data bit group of the input block of ciphered data bits and loaded back into the Chain Key register 36. It should be apparent that at the end of these 8 cycles of operation, the Chain Key register 36 now stors the results of the module-2 addition of the first input set $K_1$ of cipher key bits and the first input block $Y_1$ of cipher data bits which may be expressed at $K_1 \oplus Y_1$.

Following this, the Block Cipher Device 40 operates through a ciphering cycle of operation during which the input block of ciphered data bits is deciphered under control of the initial input set of cipher key bits in an inverse fashion to that of the enciphering process to produce an output block of clear data bits which should be identical to that transmitted from the sending station. The output block of clear data bits is transferred from the Block Cipher device 40 to the Data Bus Out an 8-bit byte at a time necessitating 8 cycles to complete the transfer. The transfers of the successive bytes are synchronized with DOB signals provided by the timing unit of the Block Cipher device 40 which, in this case, provides 8 DOB signals to gate each succeeding byte of the output block to the Data Bus Out.

The first DOB signal is applied to condition AND circuit 12 to pass 7 bits of the first byte of the output block of clear data bits via the OR circuit 16 to one input of the exclusive OR circuit 18. At the same time, since no LIK signal is present, the inverter 8 applies a signal to condition AND circuit 10 to pass the 7 bits of the first byte of the modified set of cipher key bits from the output of the Chain Key register 36 to the other input of the exclusive OR circuit 18. The exclusive OR circuit 18 modulo-2 adds the 7 bits of the first byte of the modified set of cipher key bits with 7 bits of the firsgt byte of the output block of clear data bits with the resulting 7 bits being applied via the OR circuit 20 to the Chain Key register 36. The 7-bit result of this modulo-2 addition is also applied to the parity generator 22 to generate a parity bit for the 7 bits being applied to the Chain Key register 36. The first signal on the DOB line is also applied via the OR circuit 24 to render the AND circuit 26 effective to pass the parity bit via the OR circuit 28 to the Chain Key register 36. At the same time, the first signal of the DOB line is also passed via the OR circuit 30 and via the inverter 32 and delay unit 34 to the LCK and $\overline{LCK}$ line inputs, respectively, of the Chain Key register 36 thereby permitting the modified byte to be loaded into the Chain Key register 36. As the modified byte is loaded into the Chain Key register 36 the contents of the Chain Key register 36 is shifted down by one bit position and the next byte of the previous modulo-2 addition appears at the output of the Chain Key register 36. In a similar manner, during each of the remaining 7 cycles, each DOB signal is effective to pass the next byte of clear data bits via the AND circuit 12 and OR circuit 16 to the exclusive OR circuit 18 where it is modulo-2 added with the next modified byte of the cipher key bits from the output of the Chain Key register 36 via the AND circuit 10 with the result being loaded into the Chain Key register 36 and shifting the contents thereof down by one bit position to make the next modified byte of cipher key bits available at the output of the Chain Key register 36 for the next cycle of operation.

At the completion of these 8 cycles of operation, the Chain Key register 36 now stores a set of cipher key bits for the next deciphering cycle of operation of the Block Cipher device 40. This set of cipher key bits may be represented by the term $K_2 = K_1 \oplus Y_1 \oplus X_1$, this term being mathematically equivalent to the $K_2$ term of the enciphering process. The cryptographic apparatus of the receiving station can now operate in a similar manner as described above to produce the next output block $X_2$ of clear data bits by loading the next input block $Y_2$ of ciphered data bits and input set $K_2$ of cipher key bits into the Block Cipher device 40 and carrying out another ciphering cycle of operation. The input block $Y_2$ of ciphered data bits and the input set $K_2$ of cipher key bits are modulo-2 added $K_2 \oplus Y_2$, in a similar manner to that described above for $K_1 \oplus Y_1$, and loaded into the Chain Key register 36 while the input block $Y_2$ of ciphered data bits and the input set $K_2$ of cipher key bits is loaded into the Block Cipher device 40. As before, while completing the ciphering cycle of operation, the output block $X_2$ of clear data bits and the contents $K_2 \oplus Y_2$ of the Chain Key register 36 are modulo-2 added to produce a resulting set of cipher key bits, which may be represented by the term $K_3 = K_2 \oplus Y_2 \oplus X_2$, for the next succeeding ciphering cycle of operation. Thus, it should be apparent that a new set of cipher key bits is provided for each succeeding cycle of operation as a function of the preceding cycle of operation. As a result, each succeeding output block of clear data bits is effectively chained to all preceding cycles of operation of the cryptographic apparatus and is a function of the corresponding input block of ciphered data bits, all preceding input blocks of ciphered data bits and the initial input set of cipher key bits.

Validation of the message transmission from the sending station to the receiving station will now be described. When the Block Cipher device 40 completes the first ciphering cycle of operation on the first block of ciphered data bits, the first DOB signal produced is applied via the AND circuit 46, conditioned by the Decipher signal, and the OR circuit 52 to the Set input of the Last Byte register 70. The signal output from the AND circuit 46 is also passed via the AND circuit 60, conditioned by the Load First Byte latch presently being in the ON state, and the OR circuit 62 to the Set input to the First Byte register 68. As a result, the first deciphered data byte, which is the authentication byte, is passed via the AND circuit 50, conditioned by the Decipher signal, and OR circuit 56 and is loaded into both of the registers 68 and 70. The Set signal from the OR circuit 62 is applied via delay line 64 to reset the Load First Byte latch 58. The Load First Byte latch 58 in being reset applies a signal to decondition the AND circuit 56 and thereby remove the Set signal to the register 68. As a result, only the first authentication byte will be loaded into the register 68 whereas the Set input for the register 70, being under control of the signals on the Decipher line and the DOB line, permits each succeeding byte of clear data of the deciphered message to be successively loaded into the Last Byte register 70. If no error has occurred in the transmission of the message from the sending station to the receiving station, the last byte of the message should be an authentication byte identical to that which appeared as the first byte of the deciphered message. Accordingly, at the end of the deciphered message, the contents of registers 68 and 70 are compared by comparator 72 and if no error has occured, AND circuit 74 will be deconditioned and a sample signal provided at the end of the message decipherment will be blocked from producing an error signal. On the other hand, if the contents of the register 68 and 70 do not compare, a signal is applied to condition the AND circuit 74 so that the sample signal will cause an error signal to be produced. This error signal may be used to signal the receiving station that the authentication bytes are not equal and that an error occurred in the message transmission from the sending station to the receiving station.

While the invention has been particularly shown and described with reference to the preferred embodiment thereof, it will be understood by those skilled in the art that various changes in form and details may be made therein without departing from the spirit and scope of the invention.

What is claimed is:

1. A system for the transmission of an input message consisting of successive input blocks of clear data bits from a sending station to a receiving station, comprising:

first cryptographic apparatus included in said sending station, means applying said input message to said first cryptographic apparatus, said first cryptographic apparatus operative in successive single cipher function operations for ciphering successive input blocks of clear data bits of said input message under control of successive input sets of cipher key bits to provide an output message consisting of successive output blocks of ciphered data bits corresponding to said successive input blocks of clear data bits for transmission to said receiving station, means included in said first cryptographic apparatus providing one of said inputs for each succeeding single cipher function operation of said first cryptographic apparatus as a function of at least the preceding input block of clear data bits and the preceding output block of ciphered data bits of each preceding single cipher function operation so that each succeeding output block of ciphered data bits is effectively chained to all preceding single cipher function operations of said first cryptographic apparatus, second cryptographic apparatus included in said receiving station receiving said output message transmmitted from said sending station as an input message consisting of successive input blocks of ciphered data bits and operative in successive single cipher function operations for deciphering successive input blocks of ciphered data bits under control of successive input sets of cipher key bits to provide a deciphered message consisting of successive output blocks of clear data bits corresponding to said successive input blocks of clear data bits of said input message of said sending station, and means included in said second cryptographic apparatus providing one of said inputs for each succeeding single cipher function operation of said second cryptographic apparatus as a function of at least the preceding input block of ciphered data bits and the preceding deciphered output block of clear data bits of each preceding single cipher function operation so that each succeeding deciphered output block of clear data bits is effectively chained to all preceding single cipher function operations of said second cryptographic apparatus.

2. A system according to claim 1 wherein said input message applied to said first cryptographic apparatus includes a first authentication field of clear data bits at the beginning of the first input block of clear data bits and a corresponding second authentication field of clear data bits at the end of the last input block of clear data bits and said first cryptographic apparatus further comprising:

first store means storing said first authentication field of clear dat bits applied to said first cryptographic apparatus, second store means storing said second authentication field of clear data bits applied to said first cryptographic apparatus, and means comparing said first and second authentication fields of clear data bits to verify that corresponding authentication fields of clear data bits are applied to said first cryptograhic apparatus.

3. A system according to claim 1 wherein said input message applied to said first cryptographic apparatus includes a first authentication field of clear data bits at the beginning of the first input block of clear data bits and a corresponding second authentication field of clear data bits at the end of the last input block of clear data bits and said second cryptographic apparatus further comprising:

first store means storing a deciphered version of said first authentication field of clear data bits, second store means storing a deciphered version of said second authentication field of clear data bits, said deciphered version of said second authentication field of clear data bits being chained to all preceding single cipher function operations of said second cryptographic apparatus, and means comparing said deciphered versions of said first and second authentication fields of clear data bits to verify the message transmission from said sending station to said receiving station.

4. A cryptographic arrangement for ciphering an input message consisting of successive input blocks of clear data bits comprising:

cryptographic apparatus operative in successive single cipher function operations for ciphering said successive input blocks of clear data bits under control of successive input sets of cipher key bits to provide successive output blocks of ciphered data bits coresponding to said successive input blocks of clear data bits, and means included in said cryptographic apparatus providing one of said inputs for each succeeding single cipher function operation of said cryptographic apparatus as a function of at least the preceding input block of clear data bits and the preceding output block of ciphered data bits of each preceding single cipher function operation so that each succeeding output block of ciphered data bits is effectively chained to all preceding single cipher function operations of said cryptographic apparatus.

5. A cryptographic arrangement for deciphering an input message consisting of successive input blocks of ciphered data bits comrprising:

cryptographic apparatus operative in successive single cipher function operations for deciphering said successive input blocks of ciphered data bits under control of successive input sets of cipher key to provide successive output blocks of clear data bits corresponding to said successive input blocks of ciphered data bits, and means included in said cryptographic apparatus providing one of said inputs for each succeeding single cipher function operation of said cryptographic apparatus as a function of at least the preceding input block of ciphered data bits and the preceding deciphered output block of clear data bits of each preceding single cipher function operation so that each succeeding output block of clear data bits is effectively chained to all preceding single cipher function operations of said cryptographic apparatus.

6. A cryptographic arrangement for ciphering an input message consisting of successive input blocks of clear data bits comprising:

cryptographic apparatus operative in successive single cipher function operations for ciphering said successive input blocks of clear data bits of said input message under control of successive input sets of cipher key bits to provide successive output blocks of ciphered data bits corresponding to said successive input blocks of clear data bits, means applying said input message to said cryptographic apparatus, means applying an initial input set of cipher key bits to said cryptographic apparatus, and means included in said cryptographic apparatus operative in said successive single cipher function operations for generating a succeeding input set of cipher key bits for each succeeding single cipher function operation of said cryptographic apparatus by modifying each preceding input set of cipher key bits in accordance with each peceding input block of clear data bits and each preceding output block of ciphered data bits so that each succeeding outpuut block of ciphered data bits is chained to all preceding single cipher function operations of said cryptographic apparatus and is a function of the corresponding input block of clear data bits, all preceding input blocks of clear data bits all preceding output blocks of ciphered data bits and said initial input set of cipher key bits.

7. A cryptographic arrangement for ciphering an input message consisting of successive input blocks of ciphered data bits comprising:

cryptographic apparatus operative in successive single cipher function operations for deciphering said successive input blocks of ciphered data bits of said input message under control of successive input sets of cipher key bits to provide successive output blocks of clear data bits corresponding to said successive input blocks of ciphered data bits, means applying said input message to said cryptographic apparatus, means applying an initial input set of cipher key bits to said cryptographic apparatus, and means included in said cryptographic apparatus operative in said successive single cipher function operations for generating a succeeding input set of cipher key bits for each succeeding single cipher function operation of said cryptographic apparatus by modifying each preceding input set of cipher key bits in accordance with each preceding input block of ciphered data bits and each preceding deciphered output block of clear data bits so that each succeeding output block of clear data bits is chained to all preceding single cipher function operations of said cryptographic apparatus and is a function of the corresponding input block of ciphered data bits, all preceding input blocks of ciphered data, all preceding output blocks of clear data bits and said initial input set of cipher key bits.

8. A cryptographic arrangement according to claim 7 wherein said input message applied to said cryptographic apparatus includes a first authentication field of ciphered data bits at the beginning of the first input block of ciphered data bits and a corresponding second authentication field of ciphered data bits at the end of the last input block of ciphered data bits and further comprising:

first store means storing a deciphered version of said first authentication field of ciphered data bits, second store means storing a deciphered version of said second authentication field of ciphered data bits, said deciphered version of said second authentication field of ciphered data bits being chained to all preceding single cipher function operations of said cryptographic apparatus, and means comparing said deciphered versions of said first and second authentication fields of ciphered data bits to verify said input message applied to said cryptographic apparatus.

9. A cryptographic process for the transmission of multi-block data messages from a sending station to a receiving station comprising the steps of:

applying an input message consisting of successive input blocks of clear data bits to a first cryptographic apparatus of said sending station, ciphering said input message in successive single cipher function operations of said first cryptographic apparatus during each of which an input block of clear data bits is ciphered under control of an input set of cipher key bits to provide an output block of ciphered data bits for transmission to said receiving station, providing one of said inputs for each succeeding single cipher function operation of said first cryptographic apparatus as a function of at least the preceding input block of clear data bits and the preceding output block of ciphered data bits of each preceding single cipher function operation so that each succeding output block of ciphered data bits is chained to all preceding single cipher function operations of said first cryptographic apparatus, receiving said transmitted output blocks of ciphered data bits at a second cryptographic apparatus of said receiving station as an input message consisting of successive input blocks of ciphered data bits, deciphering said input message of successive input blocks of ciphered data bits in successive single cipher function operations of said second cryptographic apparatus during each of which an input block of ciphered data bits is deciphered under control of an input set of cipher key bits to provide an output block of clear data bits corresponding to an input block of clear data bits of said input message of said sending station, and providing one of said inputs for each succeeding single cipher function operation of said second cryptographic apparatus as a function of at least the preceding input block of ciphered data bits and the preceding output block of clear data bits of each preceding single cipher function operation so that each succeeding output block of clear data bits is chained to all preceding single cipher function operations of said second cryptographic apparatus.

10. A cryptographic process according to claim 9 wherein said input message of successive input blocks of clear data bits includes a first authentication field of clear data bits at the beginning of the first input block of clear data bits and a corresponding second authentication field of clear data bits at the end of the last input block of clear data bits and further comprising the steps of:

storing a deciphered version of said first authentication field of clear data bits in a first store means of said second cryptographic apparatus, storing a deciphered version of said second authentication field of clear data bits in a second stoe means of said second cryptographic apparatus, said deciphered version of said second authentication field of clear data bits being chained to all preceding single cipher function operations of said second cryptograhic apparatus, and comparing said deciphered versionss of said first and second authentication fields of clear data bits to verify the message transmission from said sending station to said receiving station.

11. A cryptographic process for ciphering a multi-block data message comprising the steps of:

applying an input message consisting of successive input blocks of clear data bits to a cryptographic apparatus, applying an initial input set of cipher key bits to said cryptographic apparatus, ciphering said input message in successive single cipher function operations of said cryptographic apparatus during each of which an input block of clear data bits is ciphered under control of an input set of cipher key bits to provide an output block of ciphered data bits, and providing one of said inputs for each succeeding single cipher function operation of said cryptographic apparatus as a function of at least the preceding input block of clear data bits and the preceding output block of ciphered data bits of each preceding single cipher function operation so that each succeeding output block of ciphered data bits is chained to all preceding single cipher function operations of said cryptographic apparatus.

12. A cryptograhic process for ciphering a multi-block data message comprising the steps of:

applying an input message consisting of successive input blocks of ciphered data bits to a cryptographic apparatus, applying an initial input set of cipher key bits to said cryptographic apparatus, ciphering said input message in successive single cipher function operations of said cryptograhic apparatus during each of which an input block of ciphered data bits is deciphered under control of an input set of cipher key bits to provide an output block of clear data bits, and providing one of said inputs for each succeeding single cipher function operation of said cryptograhic apparatus as a function of at least the preceding input block of ciphered data bits of each preceding single cipher function operation so that each succeeding output block of clear data bits is chained to all preceding single cipher function operations of said cryptographic apparatus.

* * * * *